US010785229B2

(12) United States Patent
Bolton et al.

(10) Patent No.: US 10,785,229 B2
(45) Date of Patent: Sep. 22, 2020

(54) ENHANCED NETWORK ACCESS CONTROL (ENAC) FRAMEWORK

(71) Applicant: GM Global Technology Operations LLC, Detroit, MI (US)

(72) Inventors: Anthony D. Bolton, Dublin (IE); Stefan Callery, Dublin (IE); James B. Currie, Macomb, MI (US); Spencer T. Searle, Shelby Township, MI (US); Conor Foley, Wicklow (IE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 210 days.

(21) Appl. No.: 16/115,963

(22) Filed: Aug. 29, 2018

(65) Prior Publication Data

US 2020/0076824 A1  Mar. 5, 2020

(51) Int. Cl.
*H04L 29/06* (2006.01)
(52) U.S. Cl.
CPC ........ *H04L 63/108* (2013.01); *H04L 63/0876* (2013.01); *H04L 63/101* (2013.01)
(58) Field of Classification Search
CPC .................. H04L 63/108; H04L 63/0876
USPC ............................................... 726/7
See application file for complete search history.

(56) References Cited

U.S. PATENT DOCUMENTS

| 5,889,958 A * | 3/1999 | Willens ................ G06F 21/41 |
| | | 709/229 |
| 2013/0132286 A1* | 5/2013 | Schaefer ................ H04W 4/44 |
| | | 705/305 |

* cited by examiner

*Primary Examiner* — Longbit Chai

(57) ABSTRACT

A method for providing enhanced network access controls (eNAC) for a network includes utilizing a database having a plurality of MAB entries set to a default disabled state, connecting a non 802.1X capable device to the network using a MAC address as a unique identifier, utilizing a network switch to challenge the non 802.1X capable device, sending the MAC address of the device to a RADIUS client to authenticate against known records, processing a connection request from the non 802.1X capable device, upon validating the connection request, granting access to the non 802.1X capable device, utilizing a MAB rescue application to temporarily change the account status for the non 802.1X capable device to an enabled state, permitting endpoint authentication of the non 802.1X capable device while the account is enabled, and preventing rogue endpoints from accessing the network by disabling all MAB entries and new accounts on the network.

20 Claims, 2 Drawing Sheets

ENHANCED NETWORK ACCESS CONTROL (ENAC) FRAMEWORK

The statements in this section merely provide background information relating to the present disclosure, and may not constitute prior art.

The present disclosure relates to network access controls, and more specifically to security issues surrounding IEEE 802.1X authentication. It is common for organizations large and small to use registration of media access control (MAC) addresses of devices as a network access control mechanism because MAC addresses operate as unique identifiers of the network interface controllers (NICs) of each device. MAC addresses, therefore, provide a modicum of control over which devices can and cannot authenticate to and/or access resources on a given network. However, while MAC addresses are unique identifiers, in practice this is often not the case due to an increasing trend of MAC spoofing. That is, the MAC of a known and authorized device, such as a printer, a scanner, or the like, may be copied and associated with a completely different device that a bad actor may wish to bring into the network. By copying and using the MAC of a known resource on the network, the bad actor may thereby give full network access to his own device on the network. Thus, while typical network access controls using 802.1X security protocols in combination with MAC address registrations operate for their intended purpose, there is a need in the art for new and improved network access controls and a control framework that effectively eliminates the potential for MAC spoofing in a MAC or MAC Authentication Bypass (MAB)-based access control framework, while improving ease of access, redundancy, resiliency, and disaster recovery capabilities.

SUMMARY

According to several aspects of the present disclosure a method for providing enhanced network access controls (eNAC) for a network utilizing IEEE 802.1X authentication standards includes: utilizing a database having a plurality of media access control authentication (MAB) entries; setting all MAB entries in the database and all new accounts added to the database to an account disabled or expired state; utilizing a MAB rescue application to change an account status for the MAC address for a non 802.1X capable device to an account enabled or non expired state for a predetermined amount of time. The method further includes connecting the non 802.1X capable device to the network using a media access control (MAC) address for the non 802.1X capable device as a unique device identifier, utilizing a network switch to challenge the device upon receiving and identifying that the device lacks 802.1X capability, sending the MAC address of the device to a Remote Authentication Dial-In User Service (RADIUS) client to authenticate against known records, and processing within the RADIUS client a connection request generated by connecting the non 802.1X capable device to the network. Upon validating the connection request and determining that the connection request is valid, the RADIUS device sends a permission validation to the network switch and granting access to the non 802.1X capable device. The method further includes permitting endpoint authentication of the non 802.1X capable device during the predetermined amount of time, and preventing rogue endpoints from accessing the network by ensuring all MAB entries and new accounts on the network are in an account disabled or expired state.

In another aspect of the present disclosure the method for providing eNAC further includes: determining a precise network location of the non 802.1X capable device relative to a prior network location of the non 802.1X capable device within a predetermined period of time.

In yet another aspect of the present disclosure the method for eNAC further includes determining a precise network location for every MAB enabled device on the network.

In yet another aspect of the present disclosure the method for eNAC further includes generating an inventory of active MAB ports.

In yet another aspect of the present disclosure the utilizing a MAB rescue service further includes utilizing the MAB rescue service to allow authorized users to query a status of a MAB based client access status; and selectively enabling access for the MAB based client for a predetermined period of time.

In yet another aspect of the present disclosure the method for eNAC further includes utilizing the MAB rescue service to address facility level client access issues; and selectively and securely enabling or non expiring accounts and addressing facility level client access issues for a predetermined period of time.

In yet another aspect of the present disclosure utilizing a MAB rescue service further includes automatically selectively enabling or non expiring accounts for high priority MAB based clients for a predetermined period of time.

In yet another aspect of the present disclosure the variable predetermined period of time is between about five minutes and about an hour.

In yet another aspect of the present disclosure automatically selectively reenabling or non expiring access for high priority MAB based clients further includes reenabling or non expiring accounts for physical security clients and physical safety clients at a facility at which physical security clients and physical safety clients were disconnected from the network.

In still another aspect of the present disclosure a system for providing enhanced network access control (eNAC) to a network includes: an account database coupled to the network and storing accounts for users, and for each of a plurality of networkable client devices, each of the user and networkable client device accounts set to a disabled or expired state by default, at least one of the plurality of networkable devices being non 802.1X capable; and a media access control authentication bypass (MAB) rescue service coupled to the network, the MAB rescue service selectively temporarily enabling or non expiring accounts in the account database for the non 802.1X capable devices, the non 802.1X capable device connected to the network and selectively generating access requests to gain access to network resources. The MAB rescue service temporarily permits non 802.1X capable devices to authenticate in a predetermined window of time, and rogue endpoints are prevented from accessing the network by ensuring all MAB entries and new accounts on the network are in an account disabled or expired state.

In still another aspect of the present disclosure selectively temporarily enabling or non expiring accounts further includes determining a precise network location of each non 802.1X capable device on the network relative to a prior known network location of the non 802.1X capable device within a predetermined period of time.

In still another aspect of the present disclosure selectively temporarily enabling or non expiring accounts further includes enabling or non expiring an account for a non 802.1X capable device during the predetermined window of time, and once the non 802.1X capable device authenticates to the network disabling the account for the non 802.1X capable device.

In still another aspect of the present disclosure the MAB rescue service determines a precise network location of every MAB enabled device on the network, and generates an inventory of active MAB ports.

In still another aspect of the present disclosure the MAB rescue service includes an interface allowing authorized users to query a status of a MAB enabled client.

In still another aspect of the present disclosure the MAB rescue service includes an interface allowing authorized users to view facility level MAB enabled client access issues; and selectively and securely enabling or non expiring accounts and addressing facility level client access issues for the predetermined window of time.

In still another aspect of the present disclosure the interface further includes settings for automatically selectively enabling or non expiring accounts for high priority MAB enabled clients for predetermined window of time.

In still another aspect of the present disclosure the settings for automatically selectively enabling or non expiring accounts for high priority MAB enabled clients further include enabling or non expiring accounts for physical security clients and physical safety clients at a facility at which physical security clients and physical safety clients were disconnected from the network.

In still another aspect of the present disclosure the predetermined window of time of time is between about fifteen minutes and about one hour.

In still another aspect of the present disclosure the predetermined window of time has approximately one second precision.

In still another aspect of the present disclosure a method for providing enhanced network access controls (eNAC) for a network utilizing IEEE 802.1X authentication standards includes: utilizing a database having a plurality of media access control authentication (MAB) entries; setting all MAB entries in the database and all new accounts added to the database to an account disabled or expired state, and utilizing a MAB rescue application to change an account status for a non 802.1X capable device to an account enabled or non expired state for a predetermined amount of time. The method further includes connecting the non 802.1X capable device to the network using a media access control (MAC) address as a unique device identifier. The method further includes validating the access request by determining a precise network location for every MAB enabled non 802.1X capable device relative to prior network locations for the non 802.1X capable device within a predetermined period of time, and upon validating the access request and determining that the access request is valid, permitting endpoint authentication of the non 802.1X capable device during the predetermined amount of time, reverting a MAB entry for the non 802.1X capable device to the account disabled or expired state in the database once either the non 802.1X capable device has successfully authenticated to the network or the predetermined amount of time has elapsed; and preventing rogue endpoints from accessing the network by ensuring all MAB entries and new accounts on the network are in an account disabled or expired state.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

Figure 1:
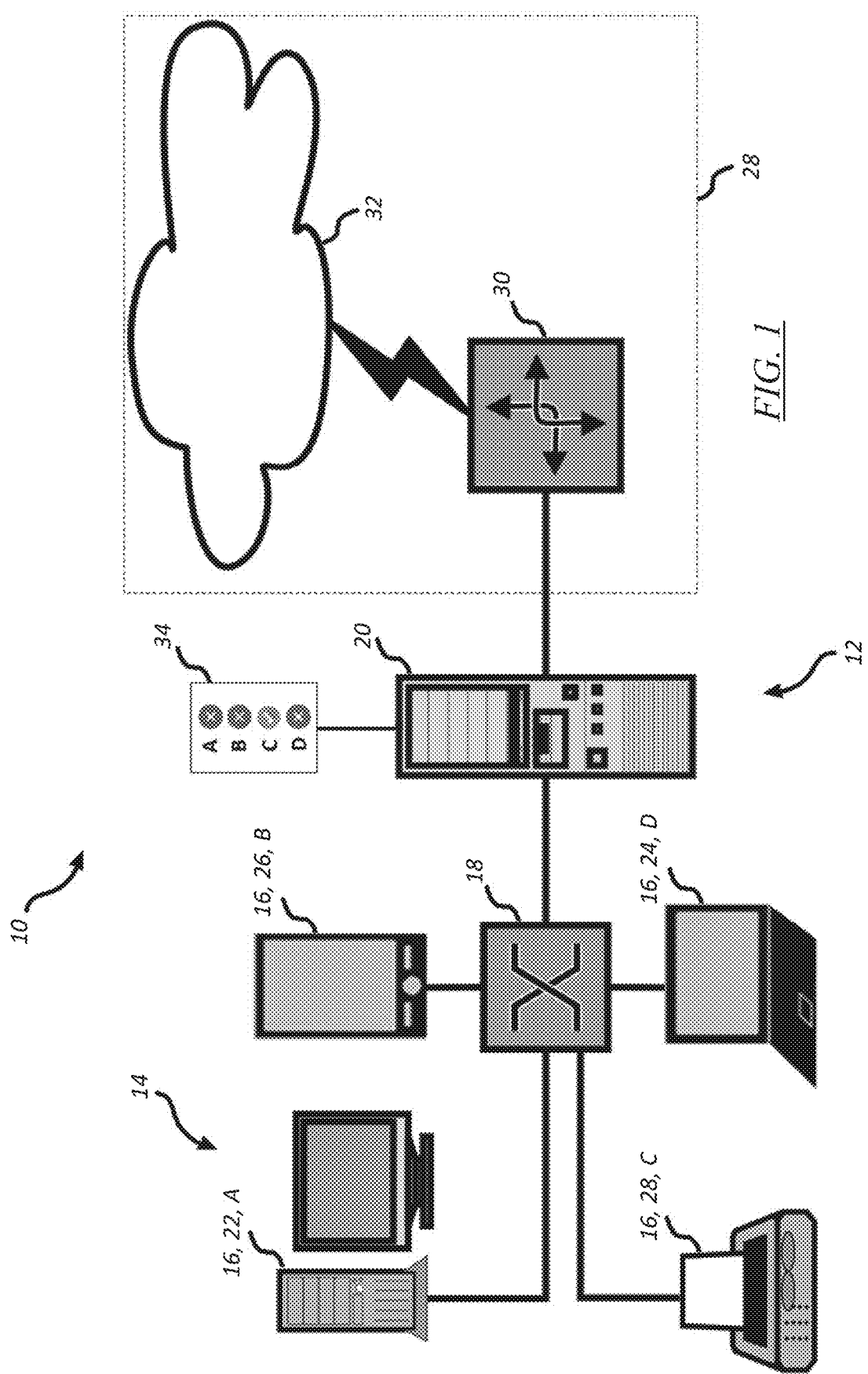
FIG. 1 is a schematic diagram of a network system according to an aspect of the present disclosure.

Reference will now be made in detail to several embodiments of the disclosure that are illustrated in accompanying drawings. Whenever possible, the same or similar reference numerals are used in the drawings and the description to refer to the same or like parts or steps. These and similar directional terms are not to be construed to limit the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises", "includes," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "disposed on," "connected to," or "coupled to" another element or layer, it may be directly on, engaged, disposed, connected or coupled to the other element or layer, or intervening elements or layers may be present. In contrast, when an element is referred to as being "directly on," "directly engaged to," "directly disposed on," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

The term "computer" or "server" as used herein generally includes any electronic control device having a preprogrammed digital computer or processor, memory or non-transitory computer readable medium used to store data such as control logic, software applications, instructions, computer code, software, or applications, data, lookup tables, etc., and a transceiver [or input/output ports]. computer readable medium includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device. Computer code, software, or applications includes any type of program code, including source code, object code, and executable code. The processor is configured to execute the code or instructions. In some examples, the computer or server also includes a dedicated Wi-Fi controller configured to wirelessly communicate with wireless communications hotspots using Wi-Fi protocols under IEEE 802.1X.

The computer or server further includes one or more applications. An application is a software program configured to perform a specific function or set of functions. The application may include one or more computer programs, software components, sets of instructions, procedures, functions, objects, classes, instances, related data, or a portion thereof adapted for implementation in a suitable computer readable program code. The applications may be stored within the memory or in additional or separate memory. Examples of the applications include audio or video streaming services, games, browsers, social media, network management systems, directory access and management systems, and the like, without departing from the scope or intent of the present disclosure.

The following description is merely exemplary in nature and is not intended to limit the present disclosure, application, or uses.

Referring to FIG. 1 a network access control system is shown and indicated generally by reference number 10. The network access control system 10 may be used with a wide variety of public and/or private network systems without departing from the scope or intent of the present disclosure. The network access control system 10 selectively provides access to a network 12 by a variety of networkable devices 14. In some examples, the networkable devices 14 are attached to the network via IEEE 802.1X authentication standards. 802.1X authentication generally involves three parties: a supplicant or device 16, an authenticator 18, and an authentication server 20. The supplicant 16 is a client or client device such as a desktop computer 22, a laptop 24, a personal data assistant (PDA), a tablet computer 26, a cellular device such as a smartphone, a networkable printer 28, or the like. The supplicant 16 generates a request to attach to the network 12. In some examples, the network 12 is a local area network (LAN) or wireless local area network (WLAN). In further examples, the supplicant 16 is computer software running on a client device such as one of the aforementioned desktop computer 22, a laptop 24, a personal data assistant (PDA), a tablet computer 26, a cellular device such as a smartphone, a networkable printer 28, or the like. The supplicant 16 provides credentials to the authenticator 18. The authenticator 18 is a network device, such as an ethernet switch, a wireless access point, or the like. The authentication server 20 is typically a host device, such as a network server, or other such devices. The authentication server 20 uses computer software supporting Remote Authentication Dial-In User Service (RADIUS) and/or Password Authentication Protocol (PAP), Challenge-Handshake Authentication Protocol (CHAP), Extensible Authentication Protocol (EAP), or the like. The RADIUS service provides centralized authentication, authorization, and accounting management for users who connect to and use a network 12 service.

In some instances, the authentication server 20 computer software may be running on the authenticator 18 device hardware. The authenticator 18 acts as a security guard to a protected network 12. The supplicant 16, is prevented from accessing the network 12 via the authenticator 18 until the supplicant's 16 identity has been validated and verified. That is, until the supplicant's 16 credentials have been validated and authorized, the authenticator 18 will prevent the supplicant 16 from accessing a protected side 28 of the network 12, including routers 30, intranet and internet sites 32, and the like. With 802.1X port-based authentication, the supplicant 16 provides credentials, such as a user name/password, or digital certificate to the authenticator 18, and the authenticator 18 forwards the credentials to the authentication server 20 for verification. If the authentication server 20 determines the credentials are valid, the supplicant 16 is allowed to access resources located on the protected side 28 of the network 12.

However, in some instances, supplicant devices 16 not capable of 802.1X network access control (NAC) must be allowed to connect to a given network 12. In large networks 12, non 802.1X NAC capable devices 16 are fairly common. Such non-802.1X NAC capable devices 16 may include legacy devices, some printers, fax machines, VoIP phones, door locks, and other physical access control devices within a physical building, and the like without departing from the scope or intent of the present disclosure. Therefore, in order to allow non-802.1X NAC capable devices 16 onto the network, purposeful gaps in the 802.1X authentication requirements of the network 12 must be made. The non-802.1X NAC capable devices 16 are then, registered with the network 12 by individual media access control (MAC) addresses via a process known as media access control authentication bypass or "MAB". Because, in theory at least, the MAC address of a given device 16 is a unique identifier of that particular device 16, using the MAC address of a given device 16 to authenticate that device 16 to the network 12 provides a network access control mechanism. In order to determine the veracity and authenticity of non 802.1X NAC capable device 16 access requests, the authentication server 20 includes a database 34 having accounts "A", "B", "C", and "D" and so forth; each account "A", "B", "C", and "D" associated with a specific device 16. In the example of FIG.

1, account "A" is associated with the desktop computer 22, account "B" is associated with the tablet computer 26, account "C" is associated with the networkable printer 28, and account "D" is associated with a laptop computer 24. However, it should be appreciated, that fewer or a far greater number of accounts may reside in the database 34 than what is depicted in FIG. 1. Moreover the accounts may represent a wide variety of devices 16 and/or users not described specifically herein, without departing from the scope or intent of the present disclosure. In some examples, however, MAC addresses are changeable in software or firmware. Accordingly, a MAC address for a given piece of device 16 hardware may be falsely or incorrectly be associated with another supplicant 16 device. Put another way, MAC addresses can be spoofed. Because MAC addresses can be altered in software or firmware for a variety of different network-capable devices 16 the use of MAC addresses to register non-802.1X NAC capable devices 16 creates a loophole in the 802.1X security of the network 12. The security loophole can be used by a rogue system or rogue user by using a MAC address of a valid networked device 16 to fraudulently gain access the network. The fraudulent access can be achieved in at least two ways, namely by removing the valid networked device 16 from the network authenticator switch 18, or by connecting to a different networked switch 18 and using the same MAC address of the valid networked devices 16.

Figure 2:
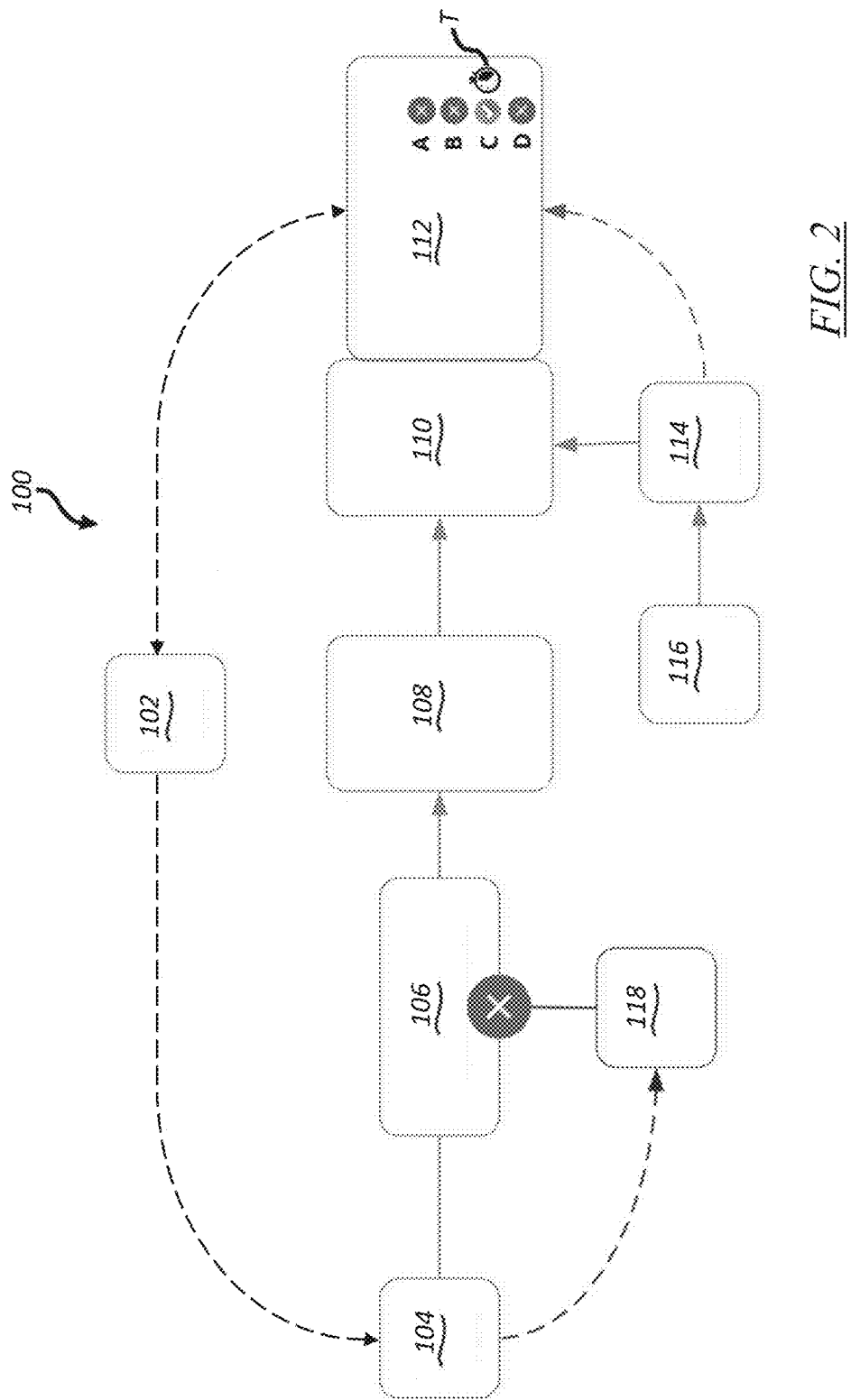
FIG. 2 is a flowchart of a method for enhanced network access control for a network according to an aspect of the present disclosure.

Referring now to FIG. 2, and with continued reference to FIG. 1, a method for enhanced network access control (eNAC) for the network 12 is shown and indicated generally by reference number 100. The method begins at block 102 where all MAB database entries in the database 34 are set to an account disabled or expired state, and where all new accounts added to the network 12 via the database 34 are also set to an account disabled or expired state. In several aspects, the account disabled state includes disabling predetermined communication ports to prevent unauthorized or otherwise unwanted access by the new accounts or by supplicant 16 devices utilizing MAB to access the network 12.

At block 104 a non 802.1X capable device 16 requests access the network 12 by using the device's 16 MAC address as a unique identifier. At block 106 an 802.1X enabled network switch 18 challenges the non 802.1X capable device 16's access request. At block 108, upon receiving and identifying a lack of 802.1X capability in the non 802.1X capable device 16, the network switch 18 sends the non 802.1X capable device 16's MAC address to a RADIUS service hosted on the authenticator 18 or the authentication server 20, or both, to authenticate against. The RADIUS service processes the access request generated by the non 802.1X capable device 16's attempt to connect to the network 12 by querying the database 34 at block 110 for a user ID and password provided by the non 802.1X capable device 16. In some aspects, the database 34 is a lightweight directory access protocol (LDAP) system, a directory server such as an Active Directory server, a name server, or like systems accessing and maintaining distributed directory information services over an internet protocol (IP) network 12. In an example in which the MAC address is being used as the unique identifier for a given non 802.1X capable device 16, the MAC address operates as both user ID and password. At block 112, because the MAB database entries and the new account entries were set to a disabled state at block 102, endpoint authentication for the access requesting supplicant 16 device by the RADIUS service will fail. That is, because the MAB database entry for the non 802.1X capable device 16 that is requesting access is set to "disabled," or "expired" the RADIUS service will reject the connection authorization request, and the network switch 18 port which would otherwise have granted network 12 access to the non 802.1X capable device 16 will remain disabled or expired. Therefore, at block 112, the non 802.1X capable device 16 will still be unable to connect to the network 12.

At block 114 a MAB rescue service hosted on a MAB rescue server is utilized to manage the account status MAC records of devices 16, and to enable MAB entries or accounts for a predetermined duration, window, or period of time "T". In several aspects, the MAB rescue service is a computerized software application running on a variety of computer hardware and allowing access to MAB database entries to authorized personnel. In some aspects, the MAB rescue service is hosted on the authenticator 18 hardware, the authentication server 20 hardware, or both. In additional aspects, the MAB rescue service is hosted on a distributed computing platform or a cloud computing platform providing ubiquitous access to authorized users needing access to the MAB rescue service. The predetermined period of time "T" may vary in accordance with the type of non 802.1X capable device 16 at issue, as well as the nature of the particular network system on which the non 802.1X capable device is to be used. In one example, the predetermined period of time "T" is in the range of up to about 120 hours. In another example, the predetermined period of time "T" is between about five minutes to an hour. In yet another example the predetermined period of time "T" is between about fifteen minutes to forty-five minutes. In still another example, the predetermined period of time "T" is between about twenty to about thirty minutes. While the predetermined period of time "T" has been described as being in the range of up to about 120 hours, it should be appreciated that depending on the type of device 16 at issue, the circumstances of the access request, the location, outage conditions, and the like, the predetermined period of time "T" may vary substantially from the above-referenced ranges. In any case, once the predetermined period of time "T" expires, if the device 16 for which the account was enabled or non-expired (in this example, account "C"), will be prevented from gaining access to the network 12, as the account will have reverted automatically to the disabled or expired state. By using the account expiration date attribute in the account for a given MAC address in the database 34, a high level of time-based precision is achievable. That is, the expiration of the predetermined period of time "T" can be set with approximately one second precision with a unique expiration date or time for each individual MAC address account in the database 34. Accordingly, no account cleanup process is required, and no additional or secondary databases are needed to track desired MAC account expiration dates or times. Moreover, no additional load is created on directory 34 servers, as no account level changes are needed to move the account to a disabled or expired state when the predetermined period of time "T", set in the MAB rescue service, expires.

At block 116, in some aspects, the MAB rescue service is accessible to authorized personnel via an administrative console (not specifically shown). The administrative console may be a web-based interface, a virtual machine or server interface on the LAN, WLAN, or more generally, on a local intranet, or the like. An authorized individual having access to the MAB rescue service for eNAC is an individual having authority to perform IT support functions within a given network infrastructure. In some examples, the authorized individual may be an on-site technician at a location where use of the MAB rescue service is needed to re-connect devices 16 to the network 12. In other examples, the authorized individual may be a remotely-located individual changing MAB database entry information in response to a variety of situations at physical locations remote to the authorized individual. In some aspects, the variety of situations in which the MAB rescue service is used include, but are not limited to: disaster recovery situations, power outages, server or network outages, lifecycle management processes, new device installation, maintenance, or the like without departing from the scope or intent of the present disclosure. When the MAB rescue service is utilized to change an account status for a particular non 802.1X capable device 16 16 for the predetermined period of time "T", an endpoint device such as a non 802.1X capable device 16 may authenticate using the device's unique MAC information and gain access to the network 12. However, once the device has authenticated to the network, the MAB entry or account for that particular device is then returned automatically to the disabled state. Accordingly, at block 118, if a rogue endpoint such as a computer, server, or the like operated by an individual wishing to gain access to the network 12 by MAC address spoofing attempts to spoof the MAC of a valid endpoint supplicant 16 device, such an attempt will fail. The attempt will fail because the MAB entry or account of the valid supplicant 16 endpoint device will already have reverted to the disabled state. Once the MAB database entry or account of the valid supplicant 16 has reverted to the disabled state, spoofing of the MAC address of the valid device 16 is prevented.

In an example, a power outage at a facility disconnects a plurality of valid supplicant 16 devices from the network 12. While many of the supplicants 16 are 802.1X capable, and will therefore automatically re-connect, authenticate, and be provided access to the network 12 certain other non 802.1X capable device 16s must reconnect via MAB. Certain of the non 802.1X capable supplicants 16 may be granted a high priority designation, while other non 802.1X capable supplicants 16 will not receive such a designation. In some examples, the high priority designation may be applied to physical security and safety devices, such as fire suppression systems, smoke alarms, door locks, and the like. In the MAB rescue service, supplicant 16 devices having a high priority designation may be automatically re-registered with the network 12, rather than requiring an authorized individual to manually temporarily re-enable the accounts or database entries for each of the high priority supplicant 16 devices.

In a measure to provide additional security in relation to supplicants 16 accessing the network 12 via MAB authentication rather than 802.1X, the MAB rescue service may also perform a variety of database 34 queries. In some aspects the database 34 queries include historical location information, online time information, and the like. In the example of historical location information database 34 queries, the MAB rescue service can determine whether the MAC address of a particular supplicant 16 has traveled between a known previous network 12 location and a current location at which the supplicant 16 is making an authentication request. In one example, if a distance traveled between prior and current network 12 locations is too great to have been accomplished in a given amount of time (a so-called "unpossible" or "impossible" traveler scenario), despite an otherwise approvable authentication request having been generated, the MAB rescue service may selectively warn or deny account status changes to an authorized individual using the MAB rescue service. In a second example, a lifecycle of a particular supplicant 16 device is managed by selectively preventing access to the particular supplicant 16 device when an age of the supplicant 16 device reaches a predetermined threshold. In the second example, lifecycle supplicant 16 device management can prevent or limit the known older and potentially more vulnerable hardware from attaching to the network 12. Thus, the MAB rescue service may selectively prevent enabling of an account for a supplicant 16 device beyond the predetermined lifecycle of that particular supplicant 16 device.

An enhanced network access control framework of the present disclosure offers several advantages including a control framework that effectively eliminates the potential for MAC spoofing in a MAC or MAC Authentication Bypass (MAB)-based access control framework, while improving ease of access, redundancy, resiliency, and disaster recovery capabilities.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A method for providing enhanced network access controls (eNAC) for a network utilizing IEEE 802.1X authentication standards comprises:
   utilizing a database having a plurality of media access control authentication bypass (MAB) entries;
   setting each account status of all MAB entries and all newly added accounts in the utilized database to a disabled or expired state;
   utilizing a MAB rescue application to change the account status for a media access control (MAC) address of a non 802.1X capable device to an enabled or non expired state for a predetermined amount of time;
   connecting the non 802.1X capable device to the network using the MAC address of the non 802.1X capable device as a unique device identifier;
   permitting endpoint authentication of the non 802.1X capable device during the predetermined amount of time; and
   preventing rogue endpoints from accessing the network by ensuring each of all MAB entries and new accounts has an account on the network status as disabled or expired after either the non 802.1X capable device has successfully authenticated to the network or the predetermined amount of time has elapsed.

2. The method for eNAC for a network of claim 1 further comprising: determining a precise network location of the non 802.1X capable device relative to a prior network location of the non 802.1X capable device within a predetermined period of time.

3. The method for eNAC for a network of claim 2 further comprising: determining a precise network location for every MAB enabled device on the network.

4. The method for eNAC for a network of claim 2 further comprising: generating an inventory of active MAB ports.

5. The method for eNAC for a network of claim 1 wherein utilizing a MAB rescue service further comprises:
   utilizing the MAB rescue service to allow authorized users to query a status of a MAB based client access status; and
   selectively enabling access for the MAB based client for a predetermined period of time.

6. The method for eNAC for a network of claim 5 further comprising:

utilizing the MAB rescue service to address facility level client access issues; and selectively and securely enabling or non expiring accounts and addressing facility level client access issues for a predetermined period of time.

7. The method for eNAC for a network of claim 1 wherein utilizing a MAB rescue service further comprises automatically selectively enabling or non expiring accounts for high priority MAB based clients for a predetermined period of time.

8. The method for eNAC for a network of claim 7 wherein the predetermined period of time is between about five minutes and about an hour.

9. The method for eNAC of claim 7 wherein automatically selectively reenabling or non expiring access for high priority MAB based clients further comprises reenabling or non expiring accounts for physical security clients and physical safety clients at a facility at which physical security clients and physical safety clients were disconnected from the network.

10. A system for providing enhanced network access control (eNAC) for a network utilizing IEEE 802.1X authentication standards comprises:

an account database coupled to the network for storing accounts for users, and a plurality of networkable client devices, and setting each account status of the user and the plurality of networkable client devices to a disabled or expired state by default, wherein at least one of the plurality of networkable devices is a non 802.1X capable device; and a media access control authentication bypass (MAB) rescue service coupled to the network for selectively and temporarily enabling or not expiring accounts in the account database for the non 802.1X capable devices for a predetermined window of time to connect to the network and selectively generate access requests for gaining access to network resources using a media access control (MAC) address of the non 802.1X capable device as a unique device identifier, wherein the MAB rescue service temporarily permits non 802.1X capable devices to authenticate in the predetermined window of time, and rogue endpoints are prevented from accessing the network by ensuring each of all MAB entries and new accounts on the network has an account status as disabled or expired after either the non 802.1X capable device has successfully authenticated to the network or the predetermined window of time has elapsed.

11. The system for controlling access to a network of claim 10 wherein selectively temporarily enabling or non expiring accounts further comprises determining a precise network location of each non 802.1X capable device on the network relative to a prior known network location of the non 802.1X capable device within a predetermined period of time.

12. The system for controlling access to a network of claim 10 wherein the selectively temporarily enabling or non expiring accounts further comprises enabling or non expiring an account for a non 802.1X capable device during the predetermined window of time, and once the non 802.1X capable device authenticates to the network disabling the account for the non 802.1X capable device.

13. The system for controlling access to a network of claim 12 wherein the MAB rescue service determines a precise network location of every MAB enabled device on the network, and generates an inventory of active MAB ports.

14. The system for controlling access to a network of claim 12 wherein the MAB rescue service includes an interface allowing authorized users to query a status of a MAB enabled client.

15. The system for controlling access to a network of claim 12 wherein the MAB rescue service includes an interface allowing authorized users to view facility level MAB enabled client access issues; and selectively and securely enabling or non expiring accounts and addressing facility level client access issues for the predetermined window of time.

16. The system for controlling access to a network of claim 12 wherein the interface further comprises settings for automatically selectively enabling or non expiring accounts for high priority MAB enabled clients for predetermined window of time.

17. The system for controlling access to a network of claim 16 wherein the settings for automatically selectively enabling or non expiring accounts for high priority MAB enabled clients further comprise enabling or non expiring accounts for physical security clients and physical safety clients at a facility at which physical security clients and physical safety clients were disconnected from the network.

18. The system for controlling access to a network of claim 12 wherein the predetermined window of time of time is between about fifteen minutes and about one hour.

19. The system for controlling access to a network of claim 10 wherein the predetermined window of time has approximately one second precision.

20. A method for providing enhanced network access controls (eNAC) for a network utilizing IEEE 802.1X authentication standards comprises:

utilizing a database having a plurality of media access control authentication bypass (MAB) entries;

setting each account status of all MAB entries and all newly added accounts in the utilized database to a disabled or expired state;

utilizing a MAB rescue application to change the account status for a non 802.1X capable device as enabled or non expired for a predetermined amount of time;

connecting the non 802.1X capable device to the network using a media access control (MAC) address as a unique device identifier;

validating an access request sent by every MAB enabled non 802.1X capable device based on determining a precise network location relative to prior network locations associated with the non 802.1X capable device within a predetermined period of time;

upon validating the access request and determining that the access request is valid, permitting endpoint authentication of the non 802.1X capable device to gain access to network resources during the predetermined amount of time; and reverting the account status of the MAB entry of the non 802.1X capable device as disabled or expired in the database once either the non 802.1X capable device has successfully authenticated to the network or the predetermined amount of time has elapsed; and preventing rogue endpoints from accessing the network by ensuring each of MAB entries and new accounts on the network has an account status as disabled or expired.

* * * * *